Aug. 22, 1967  A. HOYLER  3,336,619
WINDSHIELD WIPER INSTALLATION
Original Filed Sept. 30, 1959  5 Sheets-Sheet 1

INVENTOR
Alfred Hoyler
by Michael S. Striker
Attorney

Aug. 22, 1967  A. HOYLER  3,336,619
WINDSHIELD WIPER INSTALLATION
Original Filed Sept. 30, 1959  5 Sheets-Sheet 5

INVENTOR
Alfred Hoyler
by
Michael S. Striker
Attorney

United States Patent Office 3,336,619
Patented Aug. 22, 1967

3,336,619
WINDSHIELD WIPER INSTALLATION
Alfred Hoyler, Buhlertal, Baden, Germany, assignor to Robert Bosch G.m.b.H., Stuttgart, Germany
Continuation of application Ser. No. 843,427, Sept. 30, 1959. This application May 11, 1966, Ser. No. 549,371
Claims priority, application Germany, Oct. 1, 1958, A 30,434
17 Claims. (Cl. 15—250.14)

This is a continuation of my copending application Ser. No. 843,427, filed Sept. 30, 1959, now abandoned.

The present invention relates to windshield wiper installations.

More particularly, the present invention relates to windshield wiper installations of the type which are used on automobiles.

As is well known, the conventional windshield wiper installations used at the present time on automobiles include a pair of blades which sweep through areas of the windshield which are entirely separate and spaced from each other so that during operation on the windshield there is always a central zone of the windshield which is not acted upon by the blades. Where the windshield blades have been constructed so that they cover the central portion of the windshield and thus sweep in part through a common area it has been found that conflict between the blades inevitably results, they strike against each other, and maintenance of a reliably operating installation under these conditions has proved to be impossible where the blades move toward and away from each other as is conventional. Moreover, the tendency in recent times to operate the windshield wiper blades at relatively high speeds has rendered the provision of a satisfactory installation where the blades sweep through a common central portion of the windshield even more difficult.

It is one of the primary objects of the present invention to provide a windshield wiper installation which is capable of having an intermediate portion of the windshield acted upon by both blades while at the same time guaranteeing that there is absolutely no conflict between the blades so that the structure of the invention will operate reliably to provide a wiper action across substantially the entire windshield without leaving a central portion of the windshield unacted upon by the wiper blades.

Another object of the present invention is to provide a wiper blade installation of the above type which can be operated at different speeds without in any way detracting from the desired results.

A further object of the present invention is to provide a windshield wiper installation of the type referred to above which will operate reliably and efficiently even with the so-called panoramic windshields which are strongly curved.

It is also an object of the present invention to provide an installation where both of the wiper blades are driven from a single source of power while at the same time the blades are accelerated and decelerated differently in a manner which guarantees that the blades will not conflict with each other.

It is still another object of the present invention to provide a windshield wiper installation with a means which will reliably prevent jamming or other faulty operation of the installation if it should happen that a wiper blade encounters an obstruction such as ice which forms on the windshield, for example.

With the above objects in view the present invention includes in a windshield wiper installation a pair of wiper blades which are turnable between inner end positions and outer end positions, these blades being spaced at the greatest distance from each other when they are at their outer end positions and the blades overlapping each other when they are at their inner end positions so that the blades sweep through windshield areas which in part overlap each other. A moving means constructed in accordance with the present invention is operatively connected with the blades for oscillating the latter back and forth through the windshield areas swept through by the blades, and this moving means accelerates and decelerates the blades in entirely different manners, respectively, in such a way that the blades will not conflict with each other. Thus, at their inner end positions one of the blades is located over and overlaps the other of the blades, and the moving means operates on the upper one of the blades to move the latter initially faster than the lower blade which is retarded with respect to the upper blade during the initial phase of the operation of the blades. In this way the upper blade is moved out of the path of the lower blade before the latter starts to move through the common area of the windshield which is swept through by both of the blades, and then the moving means of the invention operates on the lower blade in such a way that its movement is highly accelerated and the lower blade makes up for the delay caused by retarding the lower blade during the initial phase of movement of the upper blade. The movement of both of the blades is retarded and then accelerated at a relatively slow rate when the blades move toward and then away from their outer end positions so that in the case of sharply curved "panoramic" windshields the blades will move relatively slowly at their outer end positions and thus will have no tendency to leave the surface of the windshield so that with this arrangement reliable wiping is guaranteed even at the outer end positions of the blades where relatively sharply curved portions of the windshield are contacted by the blades. Of course, during the approach of the blades back to their rest positions the moving means of the invention accelerates the lower blade with respect to the upper blades so that the lower blade first reaches its inner end position and is out of the way of the upper blade by the time the latter moves downwardly through the common area of the windshield swept through by both blades, and in this way there also is no conflict between the blades when they return to their rest position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 1A:
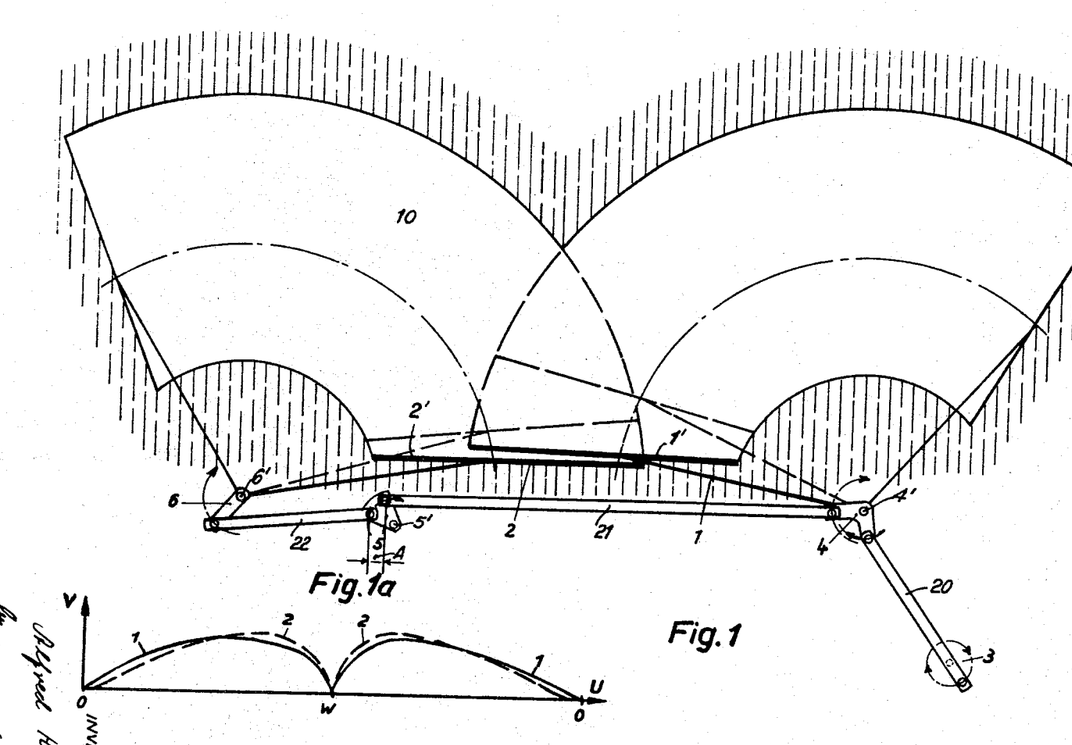
FIG. 1 illustrates one embodiment of a wiper installation according to the present invention.
FIG. 1a graphically illustrates the operation of the embodiment of FIG. 1.

Referring to FIG. 1, the windshield wiper installation illustrated therein includes a blade carrying arm 1 which carries a wiper blade 1' connected to the arm 1 in a well known, conventional manner. The drive for the wiper blade installation of the invention is derived from a rotary crank 3 which rotates continuously in a single direction which is shown as clockwise in FIG. 1, this crank 3 being connected to the shaft of any suitable electric motor which is energized when the operator wishes to set the windshield wiper installation into operation so that the crank 3 continuously turns in a single direction during operation of the windshield wiper. The crank 3 has a portion distant from its turning axis, and this portion of the crank 3 is pivotally connected with the lower end of the push-pull rod 20 shown in FIG. 1, so that during rotation of the crank 3 the push-pull rod 20 is reciprocated back and forth substantially axially. A pivot means formed by a pivot pin 4' is provided for pivotally supporting the arm 1 and the blade 1' therewith, this pivot pin 4' being carried by any suitable stationary bearing, so that when the pivot pin 4' turns about its axis the arm 1 and the wiper blade 1' will also turn, and a plate is fixed to the pivot pin 4' and pivotally connected to the push-pull rod 20 to be oscillated during movement of the rod 20 by the rotary crank 3. In the embodiment of the invention which is illustrated in FIG. 1 this plate takes the form of a bell crank 4 which is fixed to the pin 4'.

The bell crank 4 is pivotally connected at its end distant from the rod 20 to a link 21 whose end distant from the bell crank 4 is pivotally connected to a second plate 5 of sector-shaped configuration, this plate 5 being carried by a pivot pin 5' which is also supported by any suitable stationary bearing for turning movement about its axis. Thus, oscillation of the bell crank 4 is transmitted through the link 21 to the plate 5 which oscillates about the axis of the pivot pin 5'. A second link 22 is pivotally connected at its right end, as viewed in FIG. 1, to the plate 5, and the opposite end of the link 22 is pivotally connected with the outer free end of a lever 6 which is fixed to a pivot pin 6' which is supported by a stationary bearing for turning movement about its axis. This pivot pin 6' is fixed to the second blade carrying arm 2 which carries the second blade 2' in a well known manner, and the parts are shown in FIG. 1 in their rest position from which it is apparent that the blade 1' is an upper blade located over the lower blade 2' and overlapping the latter in the manner shown in FIG. 1 which illustrates that the blade 1' extends over more than half of the blade 2' in the rest position of the parts. It is preferred to locate the blade 1' in front of the operation of the vehicle so that the area swept through by the blade 1' is directly in front of the operator of the vehicle while the area swept through by the blade 2' is directly in front of a passenger beside the vehicle operator.

The manner in which the structure of FIG. 1 operates during uniform rotation of the crank 3 at a constant speed is graphically illustrated in FIG. 1a. Thus, FIG. 1a shows a graph where the vertical ordinate OV represents speed while the horizontal ordinate OU represents the angle through which the crank 3 rotates. The distance OO along the horizontal ordinate of the graph of FIG. 1a represents a single revolution of the crank 3 so that a single cycle of operation is represented along the distance OO of the horizontal ordinate, and of course this operation is repeated during each of the successive revolutions of the crank 3. The point O at the intersection of the ordinates of the graph of FIG. 1a represents the position of the parts when they are at rest and the installation is just about to begin to operate. The point W represents one-half revolution of the crank 3 and it is at this point that the pair of blades are located at their outer end positions where they are most distant from each other. It will be noted from FIG. 1 that the blades and the arms carrying the same are indicated in their outer end positions with solid lines which are not as heavy as the solid lines used to represent the blades and arms in their rest position, while the blades and arms are shown in dotted lines at an intermediate position between their inner and outer rest positions, this intermediate position being adjacent to the rest position and illustrating how the blades move with respect to each other in the common portion of the areas through which they sweep in such a way that the blades do not conflict with each other.

As is apparent from FIG. 1a, during the initial phase of the operation of the wiper installation of the invention the upper blade 1' moves at a faster rate than the lower blade 2', as is indicated by the solid line 1 of FIG. 1 which represents the movement of the upper blade as compared with the dotted line 2 which represents the movement of the lower blade. Thus, during the initial phase of the operation the upper blade wil move while accelerating away from the lower blade whose movement is retarded. Then when the lower blade moves it also accelerates, and it will be noted that the lower blade accelerates at a rate greater than the upper blade so that the lower blade overtakes the upper blade with respect to angular distance of turning and makes up for the delay resulting from the initial retarding of the movement of the lower blade, and the blades 1 and 2 approach and arrive at their outer end positions at the same time, as is evident from the curves 1 and 2 in the region of the point W in FIG. 1a. During the second half of the revolution of the crank 3 when the blades respectively move from their outer end positions toward their inner end positions, it will be seen that it is the blade 2' which moves at a faster rate and is accelerated at a greater rate than the blade 1' so that, as is clear from the second half of the curves shown in FIG. 1a the lower blade will reach its rest position ahead of the upper blade which can turn downwardly next to the lower blade without any interference from the latter, and the relative positions between the blades in the region of their rest positions as they approach toward and move away from this rest position is indicated by the dotted lines in FIG. 1.

The above-described operation of the installation of FIG. 1 in such a way that the acceleration and deceleration of the blades is different so that they can reliably overlap each other and sweep through a common central area of the windshield is derived from the plate 5 in the embodiment of FIG. 1. It will be noted that the horizontal distance A between the pivotal connections of the links 21 and 22 to the plate 5 of FIG. 1 increases during the initial part of the operation of the installation and again decreases during the final phase of the operation, and it is this increase and decrease in the horizontal distance between the pivotal connections of the links 21 and 22 to the plate 5 which produces the different accelerations and decelerations of the blades to provide the desired results with the embodiment of FIG. 1.

It will be noted from FIG. 1a that in the region of the outer end positions of the blades shown in the region of the pointer W in FIG. 1a the rate of deceleration and acceleration of the blades is relatively high, and while this operation will make no difference with a flat windshield, it may be of disadvantage with a sharply curved so-called panoramic windshield which is of a pronounced curvature particularly adjacent its outer ends. Where the acceleration and deceleration of the blades is substantial in the region of the outer ends of such a sharply curved windshield, it may happen that the blades do not press reliably against the windshield adjacent its outer ends and thus an efficient wiping is not provided, and the possibility of the lack of the desired pressure between the blades and the windshield at the outer sharply curved end portions of the latter is relatively great where the blades accelerate and decelerate rapidly as is the case with the embodiment of FIG. 1.

Figures 2, 2A:
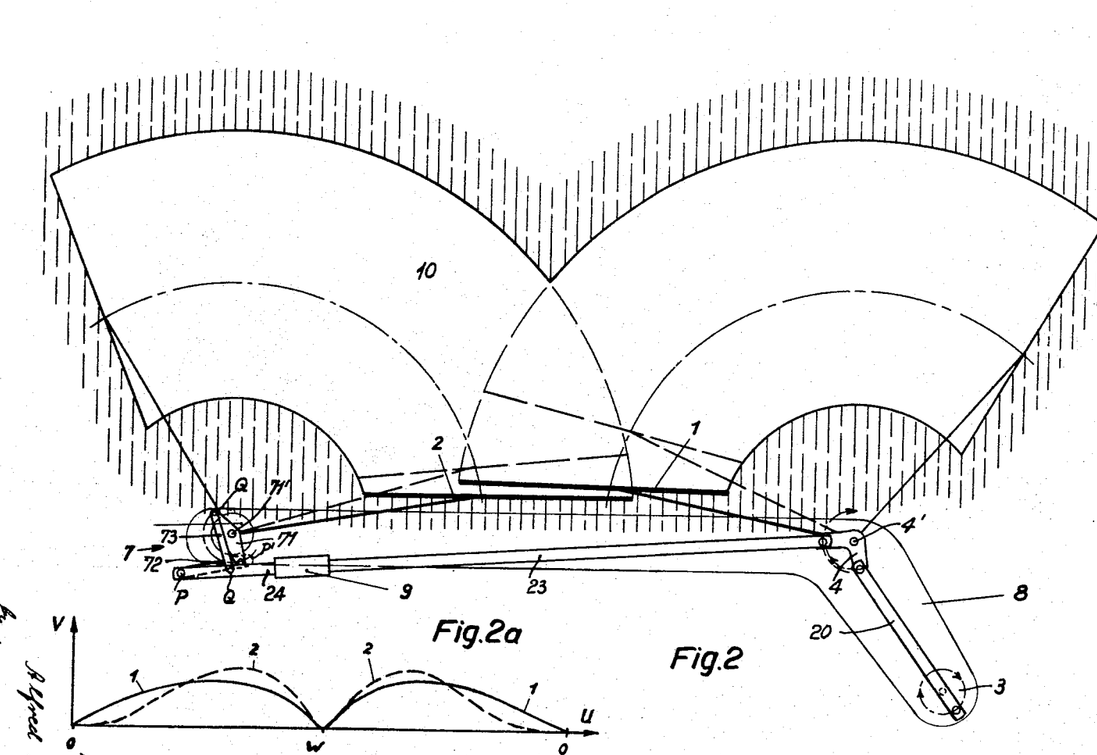
FIG. 2 illustrates another embodiment of a windshield wiper installation according to the present invention.
FIG. 2a is a graphic illustration of the operation of the wiper installation of FIG. 2.

This latter disadvantage is avoided with the embodiment of FIG. 2 which differs from FIG. 1 only in the manner in which the structure is constructed in the region of the pivot means of the lower blade. Thus, as may be seen from FIG. 2, a special linkage assembly 7 is provided at the pivot means of the lower blade in the embodiment of FIG. 2. It will be seen that the embodiment of FIG. 2 does not include an element which corresponds to the plate 5 of FIG. 1. The assembly 7 which is connected to the lower blade of FIG. 2 provides a better operation of the blades with respect to each other not only at their inner end positions but also at their outer end positions and guarantees a slower rate of acceleration and deceleration at these outer end positions so that the blades will reliably press against the windshield even if it is sharply curved.

Moreover, with the embodiment of FIG. 2 the linkage which extends to the left from the bell crank 4 is made up of a pair of elements 23 and 24 which are interconnected by a yieldable device 9 which enables the elements 23 and 24 to yield longitudinally with each other only in the case where one of the wiper blades or both of the blades encounters an obstruction such as ice forming on the windshield, so that with this yieldable means 9 injury and jamming of the installation is avoided if it should happen that a blade encounters an obstruction on the windshield.

The above-described rotary crank, push-pull rod, bell crank, and linkage of FIG. 1 as well as the corresponding elements of FIG. 2 form a moving means for moving the wiper blades at different accelerations and decelerations in such a way that they will not conflict with each other even through they sweep through a common area of the windshield, and this entire moving means is carried by a support plate 8 indicated in FIG. 2, this plate being made as rigid as possible so as to provide the desired rigidity and strength for the entire system. The support means formed by the plate 8 of FIG. 2 is also provided with the embodiment of FIG. 1.

The assembly 7 which is provided at the pivot means of the lower blade of FIG. 2 includes a pair of links 72 and 73 which cross each other. The link 72 is pivotally connected at P to the left end of the member 24, as viewed in FIG. 2, while the link 73 is pivotally connected at Q to the member 24. A two-armed lever 71 is fixed to the pivot pin 71' which corresponds to the pivot pin 6' of FIG. 1 and which directly carries the arm 2 which in turn carries the wiper blade. The link 72 is pivotally connected at P' to one end of the lever 71 while the link 73 is pivotally connected at Q' to the opposite end of the lever 71 of FIG. 2. When, during the initial phase of the operation of the installation of the invention, the member 24 is pulled to the right, as viewed in FIG. 2, the points P' and Q' will turn around the axis of the pivot pin 71' in a counterclockwise direction, as viewed in FIG. 2, and when the blades have reached their outer end positions the link 72 will extend almost perpendicularly from the member 24 while the link 73 will be located substantially alongside of the member 24 so that the positions of the links 72 and 73 will become substantially reversed when the blades are in their outer end positions. The length of the links 72 and 73 are preferably chosen according to the rules laid down by Tschbyscheff, so that the point where the links 72 and 73 cross over each other is located when the assembly 7 is midway between its end positions substantially equidistant from the axis of the pivot pin 71' and a straight line interconnecting the centers of the pins P and Q. The distance of the pivot pin 71' from the member 24 remains substantially constant throughout the entire operation.

The diagram of FIG. 2a illustrates the operation of the embodiment of FIG. 2 and the curves 1 and 2 of the graph of FIG. 2a represent the movement of the upper and lower blades, respectively, the ordinate and abscissa of the graph of FIG. 2a being the same as the ordinate and abscissa of the graph of FIG. 1a. As may be seen from FIG. 2a the upper wiper blade starts to move before the lower blade starts to move while, on the other hand, when the lower blade starts to move it moves with a substantially increased acceleration, as compared with the upper blade, and finally the lower blade reaches a higher rate of speed than the upper blade and both of the blades reach their outer end positions at the same time. During the return movement of the blades from their outer end positions toward their inner end positions the lower blade initially has a greater acceleration and attains a higher speed of movement than the upper blade and reaches its inner end position ahead of the upper blade which returns at a relatively low speed to its inner end position.

Figures 3, 3A:
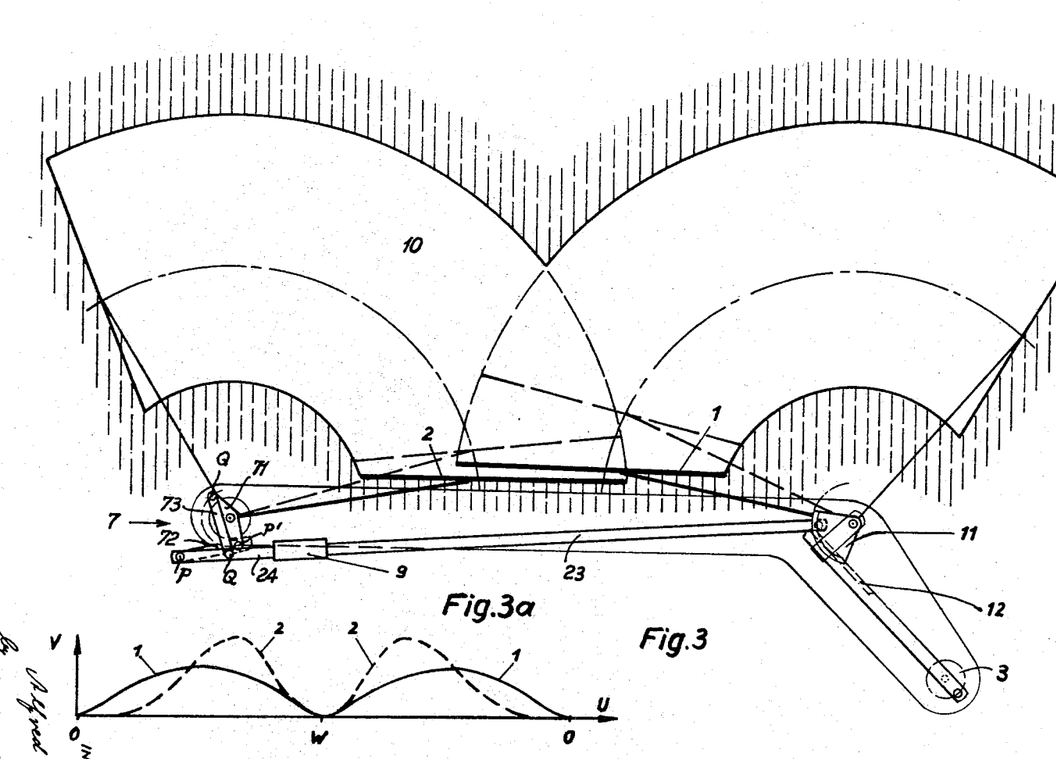
FIG. 3 illustrates a third embodiment of a wiper installation according to the present invention.
FIG. 3a graphically illustrates the operation of the embodiment of FIG. 3.

The embodiment of the invention which is illustrated in FIG. 3 is of substantially the same construction as that of FIG. 2. The only difference resides in the connection of the crank to the pivot means of the upper blade. Thus, as may be seen from FIG. 3, the push-pull rod of this embodiment takes the form of an elongated push-pull rod 12 provided with rack teeth adjacent its upper end, and the plate which is connected to the pivot means of the upper blade takes the form of a gear sector 11 having teeth which mesh with the rack teeth of the push-pull rod 12, and it is this gear sector 11 which is pivotally connected to the member 23. A suitable bracket is carried by the support means 8 and cooperates with the push-pull rod 12 to guide the latter during its reciprocation by the rotary crank 3 for maintaining the teeth of the rack 12 in mesh with the teeth of the gear sector 11, and this bracket is diagrammatically indicated in FIG. 3 as having substantially the shape of an elongated rectangle.

As is apparent from a comparison of FIG. 3a with FIG. 2a, FIG. 3a diagrammatically illustrating the embodiment of the FIG. 3, the rate of movement of the blades as they approach and move away from their outer end positions is substantially reduced as compared with the embodiment of FIG. 2, and thus the embodiment of FIG. 3 is even more suitable for use with windshields which are sharply curved adjacent their outer ends since in the region of the outer end positions of the wiper blades they will move relatively slowly with the embodiment of FIG. 3 and thus there will be practically no tendency for the blades to move away from the curved portions of the windshield. As is apparent from FIG. 3a, the embodiment of FIG. 3 provides only relatively slow and relatively small acceleration and deceleration of the upper arm 1 throughout the entire movement thereof, while on the other hand the lower blade 2 is retarded to a considerable degree with respect to the blade 1 during the initial phase of the operation and then the blade 2 rapidly accelerates to a speed considerably greater than that of the upper blade and finally in the region of the outer end positions of the blades, indicated at the point W in FIG. 3a, the upper and lower blades both move at substantially the same rates of speed and acceleration and deceleration, while during the final phase of the movement when the blades return toward their rest positions the lower blade initially accelerates quite rapidly up to its relatively high speed and then rapidly decelerates to reach its final position well ahead of the upper blade which slowly returns to its rest position in the manner indicated in FIG. 3a.

Figures 4, 4A:
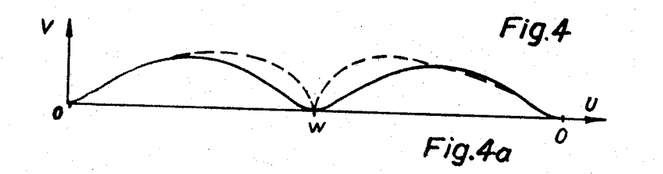
FIGS. 4a–4d illustrate the manner in which the invention operates with a sharply curved windshield.
Figure 4B:
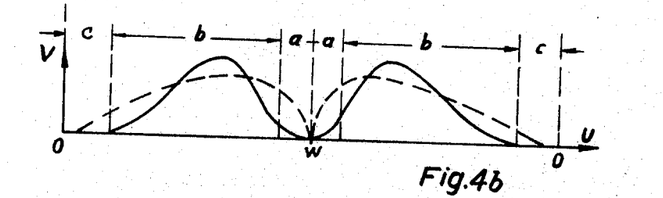
Figure 4C:
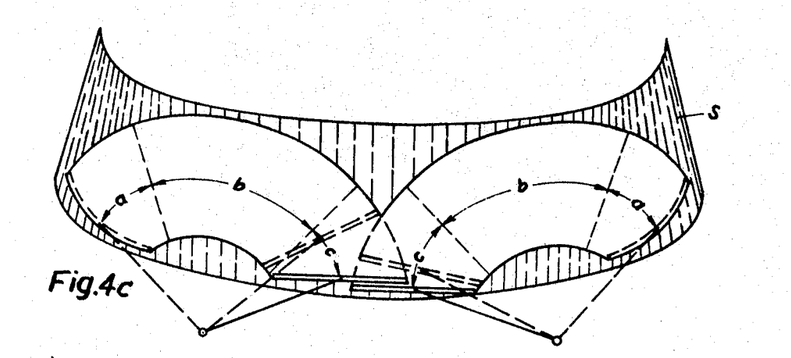
Figure 4D:
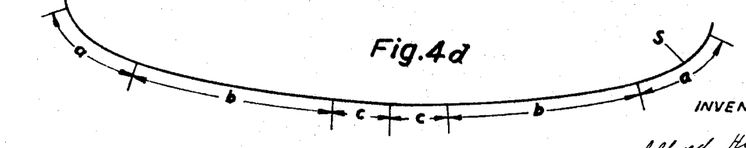

FIGS. 4c and 4d illustrate a sharply curved windshield S, and it is apparent that each of the areas swept through by the wiper blades includes an inner section c, an outer section a, and an intermediate section b. It is the inner sections c of the areas through which the blades sweep that overlap each other, while the outer section a of these areas are located at the outer ends of the windshield where the curvature thereof is most pronounced. The manner in which the blades move with respect to the different sections of the areas through which they sweep is indicated in FIGS. 4a and 4b. Thus, in FIG. 4a the dotted curve illustrates the movement of the upper wiper blade of the embodiment of FIG. 1 while the solid curve of FIG. 4a indicates the improved operation provided by the upper arm of the embodiment of FIG. 3. Thus, the dotted curve of FIG. 4a corresponds to the solid line curve shown in FIG. 1a. The solid curve of FIG. 4a on the other hand corresponds to the solid curve of FIG. 3a. Thus, a comparison between the solid curve of FIG. 3a and the solid curve of FIG. 1a is provided in FIG. 4a.

In FIG. 4b the movement of the lower arm of the embodiment of FIGS. 1 and 3 is shown with respect to the different sections of the areas through which the wiper blades sweep. Thus, referring to FIG. 4b, the dotted curve of FIG. 1a is also indicated as a dotted curve in FIG. 4b, while the dotted curve of FIG. 3a is shown in FIG. 4b as a solid curve, and it is apparent from FIG. 4b that an improved operation is provided with the structure of FIG. 3 as compared to the structure of FIG. 1.

Figure 5:
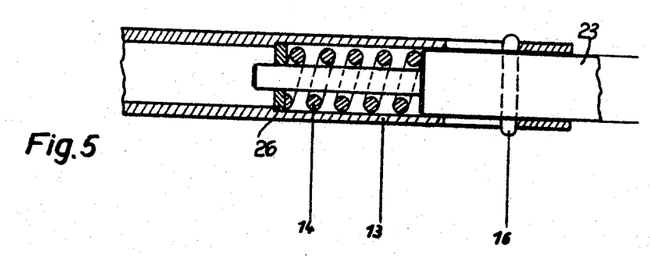
FIG. 5 is a fragmentary illustration of one embodiment of the structure which will prevent jamming of the installation when a blade encounters an obstruction.
Figure 6:
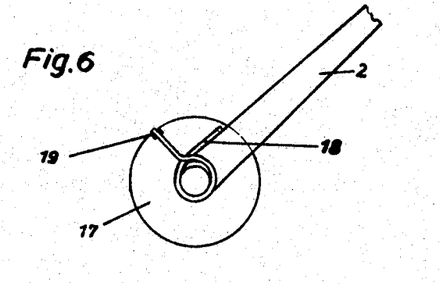
FIG. 6 illustrates another embodiment of a structure to prevent jamming when a blade encounters an obstruction.
Figure 7:
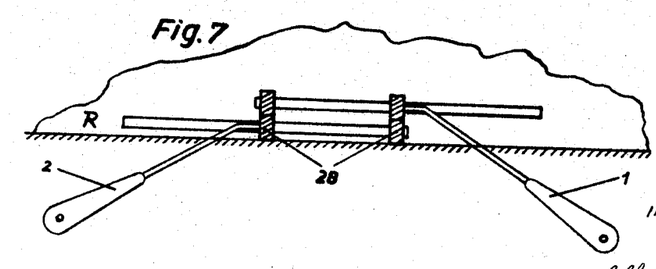
FIG. 7 illustrates a structure for prevenitng the blades from striking against each other particularly at metallic parts thereof.

FIGS. 5-7 show structures which protect the installation of the invention against jamming and injury. Thus, FIG. 5 shows the details of an elastic yieldable means such as the yieldable means 9 shown in FIGS. 2 and 3 in a diagrammatic manner. As may be seen from FIG. 5, the outer hollow tubular member 13, which corresponds to the member 24 of FIG. 3, for example, receives in its interior the left free end portion of the rod 23, and the tubular member 13 is provided with a pair of axially opposed extending slots through which extend the free end portions of a cross pin 16 carried by the rod 23 so that the length of these slots cooperates with the free ends of the pin 16 to limit the extent of axial movement of the rod sections with respect to each other. The rod 23 has an elongated free end portion of reduced diameter extending through an opening in a plate 26 which is pressed against a shoulder in the interior of the hollow rod 13, the free end portion of the rod 23 extending in a freely slidable fashion through the plate 26. A coil spring 14 is coiled around the elongated free end portion of reduced diameter of the rod 23 bears against the shoulder of the latter which is between its portions of different diameter and also bears against the plate 26. The strength of the spring 14 is such that it does not yield simply as result of an increase in the resistance encountered by the wiper blades during the movement thereof. For example, the blade 14 will not yield when the blades move along a dry windshield. However, when a substantially rigid obstruction is encountered by the blades, as, for example, when a blade encounters ice or the like on the windshield, then the spring 14 will yield so as to protect the installation of the invention.

Protective devices of the above type are used in particular with the upper blade 1 to protect the latter, and these protective devices come into play under very difficult conditions of operation as such when a layer of snow accumulates on the windshield and clings thereto, and with the protective devices of the invention illustrated in FIGS. 5-7 the structure of the invention will not jam or will not become injured. Moreover, the blades are particularly protected in the common area through which they sweep.

The embodiment illustrated in FIG. 6 will produce substantially the same result as the embodiment in FIG. 5. In FIG. 6, the carrier arm 2 for the blade 2' is illustrated, although this embodiment is also applicable to the carrier arm 1 for the blade 1'. This blade carrying arm 2 is pivotally carried by a plate 17 which in turn is pivotally supported as, for example, by the pivot means 71'. Thus, the plate 17 would be fixed to the pivot pin 71', or this plate 17 may be fixed to the pivot pin 6'. A spring 18 is coiled around the turning axis of the arm 2 engaging a projection which extends axially at the common axis of the common axis elements 2 and 17, and one arm of the spring 18 bears against the blade carrying arm 2 while the other arm engages a projection 19 so that the end which engages the projection of plate 17 cannot move with respect to the latter. Turning movement of the plate 17 is transmitted to the arm 2 through the spring 18, and the strength of the spring 18 is made in the same way as the spring 14 great enough so that the spring 18 will not yield until the blade engages an obstruction of the nature of ice or the like on the windshield.

In the embodiment illustrated in FIG. 7 blocks 28 of an elastic material such as soft rubber or the like are fixedly carried by the blades at the metallic frames thereof, and these blocks are arranged on the respective blades in such a way that the blocks 28 will engage each other when the blades are in their rest position and the blades themselves particularly at their metallic portions are reliably prevented from striking against each other with the construction shown in FIG. 7. Moreover, as is evident from FIG. 7, the blocks 28 carried by the lower blade engage the frame of the windshield at the lower central portion of the latter so as to prevent the lower blade itself from striking against the windshield frame at this region.

With modern windshield wiper installations, it is desired to be able to operate the installation at at least two different speeds. This result can be provided with the structure of the invention for example by rotating the crank 3 at two different speeds, and this can be very simply brought about by providing suitable connections for the coils of the electric motor which rotates the crank or by providing additional coils which are located in the circuit at one speed or the other, or, as is well known suitable resistances can be cut into or out of the circuit so as to increase or decrease the speed of the rotary crank and thus provide different speeds of operation for the windshield wiper installation. In each case the above-described different accelerations and decelerations of the blades with respect to each other will be provided inasmuch as the rate of movement of the blades with respect to each other is controlled by the above-described linkages which form the moving means of the invention and the speed of operation of the blades with respect to each other is not at all controlled by the speed of rotation of the crank 3.

It is particularly desirable to provide the increased speed of operation of the installation only when the wiper blades are in the intermediate sections b of the areas through which they sweep, as described above and shown in connection with FIGS. 4c and 4d. Thus, the lower speed of the wipers will be maintained at the inner sections c and at the outer section a of the areas through which the wiper blades sweep, and in this way the best possible operation of the blades is guaranteed at the inner and outer sections of the areas through which the blades sweep. This result can be obtained by connecting to the blades or the arms which carry the same electrical contacts which engage other contacts only when the blades are in the intermediate sections b for the purpose of increasing the speed of the motor which drives the rotary crank 3 only when these blades are in the intermediate sections b.

While mention has been made of retarding the movement of the lower blade with respect to the upper blade during the initial phase of the operation and even starting the movement of the lower blade after the upper blade starts to move from its rest position, it is of course also possible to simultaneously move both of the blades from their rest positions, but in this event the upper blade must be moved at substantially greater acceleration than the lower blade so as to guarantee no conflict between the movement of the blades with respect to each other. Of course, to reduce the possibility of the blades conflicting with each other the upper blade can be returned to its rest position at a relatively small speed. Moreover, if desired, it is possible to arrange the parts so that the angle through which the upper blade sweeps is somewhat smaller than the angle through which the lower blade sweeps so that in this way when the blades reach their outer end positions the upper blade will not be turned toward the outer end of the windshield to an extent greater than the lower blade. Thus, as may be seen from FIGS. 1, 2, and 3, the upper blade since it is located above the lower blade is necessarily nearer to the right end of the windshield, as viewed in FIGS. 1, 2 and 3, and if the blades are turned through exactly the same angle then of course the upper blade will in its outer end position be located closer to the right end of the windshield than the lower blade is located to the left end of the windshield, as viewed in FIGS. 1, 2 and 3 and in order to avoid this the upper blade can be turned through an angle somewhat smaller than the angle through which the lower blade turns so that in their outer end position the two blades will be located at equal distances from the ends of the windshield.

It is also possible to arrange the blades of the invention so that they will be located as far as possible from the field of vision of the operator when the blades are in their rest position.

The cooperation of the installation of the invention with a device for washing the windshield is of particular advantage since it is only necessary to provide a single nozzle for spraying a cleaning liquid onto the windshield if this nozzle is positioned so as to direct the cleaning liquid onto the section of the windshield which is common to the fields of both of the blades, and of course it is only necessary to spray the cleaning liquid onto the intermediate portion of the windshield directly above the wiper blades when the latter are in their rest positions so that the blades during their upward movement in their initial phase of the operation will spread the cleaning fluid over the windshield, and thus it is unnecessary to continue the stream of cleaning liquid onto the windshield after the initial phase of the movement of the blades.

It will be understood that each of the elements described above, or two or more together, may also find a useful application in other types of windshield wipers differing from the types described above.

While the invention has been illustrated and described as embodied in overlapping windshield wipers, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A windshield wiper installation comprising, in combination, upper and lower windshield wiper blades having a rest position where said upper blade is located over and closely adjacent to said lower blade; a pair of pivot means respectively supporting said upper and lower wiper blades for turning movement respectively about a pair of given axes, said blades being movable from said rest position thereof to outer end positions, respectively, where said blades are most distant from each other and said blades sweeping, during movement along a windshield, through areas of the latter which partly overlap each other; and moving means cooperating with said blades for simultaneously moving the same in opposite directions first away from and then toward each other, said moving means including a driving motor common to both blades, a crank rotated by said driving motor in only one direction, and linkage means connecting said crank with said blades for turning the latter about said given axes, respectively, in response to rotation of said crank, said linkage means being constructed and connected to said blades for accelerating and decelerating one of the blades differently from the other and said linkage means including in the transmission to one of said blades an elongated driving element receiving reciprocatory movement from said crank, a member secured to the pivot means of said one blade for turning movement therewith, and a pair of links which cross each other, each link being pivoted at spaced points on the link to said driving element and to said member, said pivot points on said driving element for said pair of links being spaced apart, said pivot points on said member for said pair of links being spaced apart and located on opposite sides of the axis of the latter of said pivot means, and said links connecting said driving element to said member for imparting oscillation to said member and therewith said one blade in response to reciprocatory movement of said driving element, one of said pair of links being located substantially tranverse to said elongated driving element and the other of said links being located substantially parallel to said elongated driving element when said wiper blades are in said rest position thereof.

2. A windshield wiper installation according to claim 1, said linkage further comprising a push-pull rod connected to and operated by said rotating crank and a plate fixed to the pivot means of the other of said wiper blades for turning movement therewith, said push-pull rod being operatively connected to said plate for oscillating the latter and said other blade therewith through a given angle during substantially axial reciprocation of said push-pull rod.

3. A windshield wiper installation according to claim 2, said elongated driving element comprising an elongated rod connected in the region of one end thereof to said plate and said pivot points for said pair of links being located in the region of the other end of said elongated rod.

4. A windshield wiper installation according to claim 2, said plate being in the form of a bell crank to one arm of which said push-pull rod is pivotally connected, said elongated driving element being pivotally connected to the other arm of said bell crank.

5. A windshield wiper installation according to claim 3, said elongated driving element being substantially aligned with said other arm of said bell crank and said push-pull rod being substantially aligned with said one arm of said bell crank when said wiper blades are in said rest position thereof, said push-pull rod and said elongated driving element moving out of alignment with the respective arms of said bell crank when said wiper blades are moved out of said rest position thereof.

6. A windshield wiper installation according to claim 4, wherein the arms of said bell crank are substantially normal to each other, said other arm of said bell crank extending substantially coaxially with said elongated driving element when said wiper blades are in said rest position thereof and moving out of axial alignment with respect to said elongated driving element when said blades move out of said rest position thereof.

7. A windshield wiper installation according to claim 1, said moving means being constructed and arranged to delay the movement of said one blade with respect to said other blade at the start of the operation of the installation to such an extent that said other blade has moved beyond the path through which said one blade sweeps when the latter starts moving.

8. A windshield wiper installation according to claim 1, wherein said one blade is the lower blade and said other blade is the upper blade, said moving means retarding the movement of said lower blade with respect to said upper blade at the start of the operation of the installation to an extent such that said upper blade has moved out of the path of said lower blade when the latter starts moving and said moving means accelerating said lower blade at the initial phase of the movement thereof to an extent sufficient to make up for the time lost by said lower blade during the retarding thereof at the initial phase of movement of said upper blade.

9. In a windshield wiper installation, in combination, upper and lower windshield wiper blades having a rest position where said upper blade is located over and closely adjacent to said lower blade, said blades being movable from said rest position thereof to outer end positions, respectively, where said blades are most distant from each other and said blades sweeping during movement along a windshield through areas of the latter which partly overlap each other; support means; pivot means carried by said support means for turning movement and operatively connected to each blade for supporting the latter for turning movement about a given axis; a plate fixed to the pivot means of said upper blade for turning movement with said pivot means and said upper blade; a push-pull rod operatively connected to said plate for reciprocating the latter and said upper blade therewith through a given angle during substantially axial reciprocation of said push-pull rod; crank means rotating in one direction and cooperating with said push-pull rod for reciprocating the latter; and linkage means connected to said plate and extending therefrom to the pivot means of said lower blade for reciprocating said lower blade about the axis of the pivot means thereof in response to turning of said plate, so that the single push-pull rod and crank means operate both of said blades, said linkage means cooperating with said blades to retard the movement of said lower blade during the initial phase of movement of said upper blade and to then accelerate the movement of said lower blade so that said lower blade makes up for the delay during the initial phase of the movement of said upper blade.

10. A windshield wiper installation according to claim 9, said plate being in the form of a bell crank to one arm of which said push-pull rod is pivotally connected and said linkage means including a first link pivotally connected to the other arm of said bell crank, a second plate supported by said support means for turning movement around a given axis and pivotally connected to the other end of said first link, a second link pivotally connected to said second plate at a point which is spaced from the connection of said first link to said second plate by an acute angle with respect to the turning axis of said second plate, a lever fixed to the pivot means of said lower blade, said second link being pivotally connected at its end distant from said second plate to said lever.

11. A windshield wiper installation according to claim 9, said plate being in the form of a gear sector and said push-pull rod having rack teeth meshing with said gear sector.

12. A windshield wiper installation according to claim 11, said linkage means including an elongated link extending from said gear sector, a second link pivoted to said latter link at an end position thereof distant from said gear sector; a third link pivoted to said first mentioned link between the connection of said second link and said gear sector, and a two-armed lever fixed to the pivot means of said lower blade and having opposite ends respectively connected with said second and third links, said second and third links crossing each other.

13. A windshield wiper installation according to claim 9, said linkage means including an elongated link extending from said plate, a second link pivoted to said latter link at an end position thereof distant from said plate; a third link pivoted to said first mentioned link between the connection of said second link and said plate, and a two-armed lever fixed to the pivot means of said lower blade and having opposite ends respectively connected with said second and third links, said second and third links crossing each other and one of said crossing links being located substantially transverse to and the other of said crossing links being located substantially parallel to said elongated link when said wiper blades are in said rest position thereof.

14. A windshield wiper installation comprising, in combination, a pair of wiper blades; and moving means cooperating with said blades for simultaneously moving the same in opposite directions first away from and then toward each other, said moving means accelerating and decelerating one of the blades differently from the other and said blades during movement by said moving means sweeping through a common intermediate area of the windshield, said moving means including a single motor, a single crank rotated by said motor, a push-pull rod connected to and operated by the rotating crank and a linkage connected to said rod and said blades for moving the same, said crank rotating at all times in only one direction of rotation, said linkage including in the transmission to one of said blades a pair of links which cross each other, said push-pull rod having spaced from said crank an end portion in the form of a rack and said moving means including a gear sector connected to the other of said blades for moving the latter, and meshing with said rack to be moved thereby, and said gear sector being connected with said crossing links through an elongated motion transmitting means.

15. A windshield wiper installation according to claim 1, wherein said linkage further comprises a plate turnable about a fixed axis and operatively connected to said pivot means of the other of said wiper blades for turning movement therewith, motion transmitting means connecting said plate with said crank for turning said plate back and forth in response to rotation of said crank, and connecting means carried by said plate for pivotally connecting thereto at a location spaced from said fixed axis thereof one end portion of said elongated drive element, said elongated drive element being movable by longitudinal increments of varying magnitude in response to equal angular increments of rotational movement of said plate, the magnitude of said longitudinal increments being a minimum when said blades approach said rest position thereof.

16. A windshield wiper installation according to claim 15, wherein when said wipers are in said rest position thereof, the plane including said fixed axis and the axis of said connecting means about which said elongated driving element pivots with respect to said plate includes also the axis of at least one of said spaced pivot points on said elongated driving element, said spaced pivot points on said elongated driving element being located in the region of the other end thereof.

17. A windshield wiper installation according to claim 9, said plate being in the form of a bell crank to one arm of which said push-pull rod is pivotally connected, said linkage means being pivotally connected to the other arm of said bell crank.

References Cited

UNITED STATES PATENTS

| 1,630,199 | 5/1927 | Megnin | 74—582 |
| 2,625,838 | 1/1953 | Dillard | 74—582 |
| 2,654,907 | 10/1953 | Allen | 15—250.14 |
| 2,691,186 | 10/1954 | Oishei et al. | 15—250.21 |
| 2,713,178 | 7/1955 | Stocks | 15—250.3 |
| 2,825,919 | 3/1958 | Horton | 15—250.14 |
| 2,895,158 | 7/1959 | Riester | 15—250.3 |
| 3,226,755 | 1/1966 | Fox et al. | 15—250.14 |

FOREIGN PATENTS

| 1,162,314 | 4/1958 | France. |

CHARLES A. WILLMUTH, *Primary Examiner.*